(12) United States Patent
Han et al.

(10) Patent No.: US 8,798,538 B2
(45) Date of Patent: Aug. 5, 2014

(54) MOBILE TERMINAL AND CONTROLLING METHOD THEREOF

(71) Applicant: LG Electronics Inc., Seoul (KR)

(72) Inventors: Kiwon Han, Seoul (KR); Hyunsun Yoo, Seoul (KR); Youngtae Kim, Seoul (KR); Mizi Yi, Seoul (KR); Joonbum Lee, Seoul (KR); Kabsung Chong, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/718,712

(22) Filed: Dec. 18, 2012

(65) Prior Publication Data

US 2013/0281160 A1 Oct. 24, 2013

(30) Foreign Application Priority Data

Apr. 24, 2012 (KR) ........................ 10-2012-0042707

(51) Int. Cl.
*H04B 5/00* (2006.01)

(52) U.S. Cl.
USPC .......... 455/41.1; 455/572; 455/573; 320/108; 320/114; 320/115; 307/104

(58) Field of Classification Search
CPC ...... H04B 5/0037; H02J 5/005; H02J 7/0027; H02J 17/00
USPC ......... 455/41.1, 572, 573; 320/108, 114, 115; 307/104
See application file for complete search history.

(56) References Cited

U.S. PATENT DOCUMENTS

| | | | |
|---|---|---|---|
| 7,969,177 B2 * | 6/2011 | Perkins et al. ........... | 324/762.02 |
| 2011/0309792 A1 * | 12/2011 | Mochida et al. .............. | 320/108 |
| 2012/0071217 A1 * | 3/2012 | Park .......................... | 455/575.8 |
| 2013/0026981 A1 * | 1/2013 | Van Der Lee ................. | 320/108 |

\* cited by examiner

*Primary Examiner* — Tuan Pham
(74) *Attorney, Agent, or Firm* — Birch, Stewart, Kolasch & Birch, LLP (57) ABSTRACT

A mobile terminal including a power supply unit including a chargeable battery; a wireless power transmitting unit configured to transform power supplied from the battery into a magnetic field, and to transmit the magnetic field to at least one other terminal placed within a predetermined distance from the mobile terminal; and a controller configured to control an amount of power supplied from the battery to the wireless power transmitting unit.

10 Claims, 10 Drawing Sheets

MOBILE TERMINAL AND CONTROLLING METHOD THEREOF

Pursuant to 35 U.S.C. §119(a), this application claims the benefit of earlier filing date and right of priority to Korean Application No. 10-2012-0042707, filed on Apr. 24, 2012, the contents of which are hereby incorporated by reference herein in its entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for providing a wireless charging function.

2. Discussion of the Related Art

A mobile terminal can perform various functions such as facilitating data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to their degree (e.g., ease) of mobility. Further, the mobile terminals can be further classified into handheld terminals and vehicle mount terminals according to the manner of portability.

To support and increase the terminal functions, it can consider the improvement of structural parts and/or software parts of the terminal.

The mobile terminal may include a chargeable battery to support its mobility or portability. However, it is often inconvenient to charge the battery.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which a power can be transmitted to another terminal capable of a wireless power reception by wireless.

Technical tasks obtainable from the present invention are non-limited the above-mentioned technical task. In addition, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal, which transceives a power by wireless using a magnetic field, according to one embodiment of the present invention may include a power supply unit having a chargeable battery, a wireless power transmitting unit supplied with the power from the battery, the wireless power transmitting unit transforming the supplied power into the magnetic field, the wireless power transmitting unit transmitting the magnetic field externally, and a controller controlling the power to be supplied to the wireless power transmitting unit from the battery.

Preferably, the wireless power transmitting unit transforms the power into the magnetic field by applying a current to a wire of a coil shape.

More preferably, the mobile terminal further includes a display unit and a reinforcement panel configured to prevent deformation of the display unit by contacting with one surface of the display unit, wherein the wire of the coil shape is arranged within the reinforcement panel.

More preferably, the mobile terminal further includes a display unit and a reinforcement panel configured to prevent deformation of the display unit by contacting with one surface of the display unit, wherein the wire of the coil shape contacts with one surface of the reinforcement panel.

In another aspect of the present invention, in transceiving a power by wireless using a magnetic field, a method of controlling a mobile terminal according to another embodiment of the present invention includes the steps of supplying the power to a wireless power transmitting unit from a chargeable battery of the mobile terminal and transmitting the power by transforming the power supplied to the wireless power transmitting unit into the magnetic field.

Accordingly, the present invention provides the following effects and/or features.

First of all, according to at least one of embodiments of the present invention, a mobile terminal is able to transmit a power stored in a battery to another portable device by wireless power transmission and reception.

Secondly, according to at least one of embodiments of the present invention, a mobile terminal is able to transmit a power to another terminal while receiving a power by wireless power transmission and reception.

Thirdly, according to at least one of embodiments of the present invention, a coil providable to transmit a power by wireless can be efficiently installed in a mobile terminal.

Effects obtainable from the present invention may be non-limited by the above-mentioned effect. In addition, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used to denote elements in order to facilitate the disclosure only. Therefore, significant meanings or roles are not given to the suffixes themselves, and it is understood that the suffixes 'module', 'unit' and 'part' can be used together or interchangeably.

Features of embodiments of the present invention are applicable to various types of terminals. Examples of such terminals include mobile terminals, such as mobile phones, user equipment, smart phones, mobile computers, digital broadcast terminals, personal digital assistants, portable multimedia players (PMP) and navigators. However, by way of non-limiting example only, further description will be with regard to a mobile terminal 100, and it should be noted that such teachings may apply equally to other types of terminals such as digital TV, desktop computers and so on.

Figure 1:
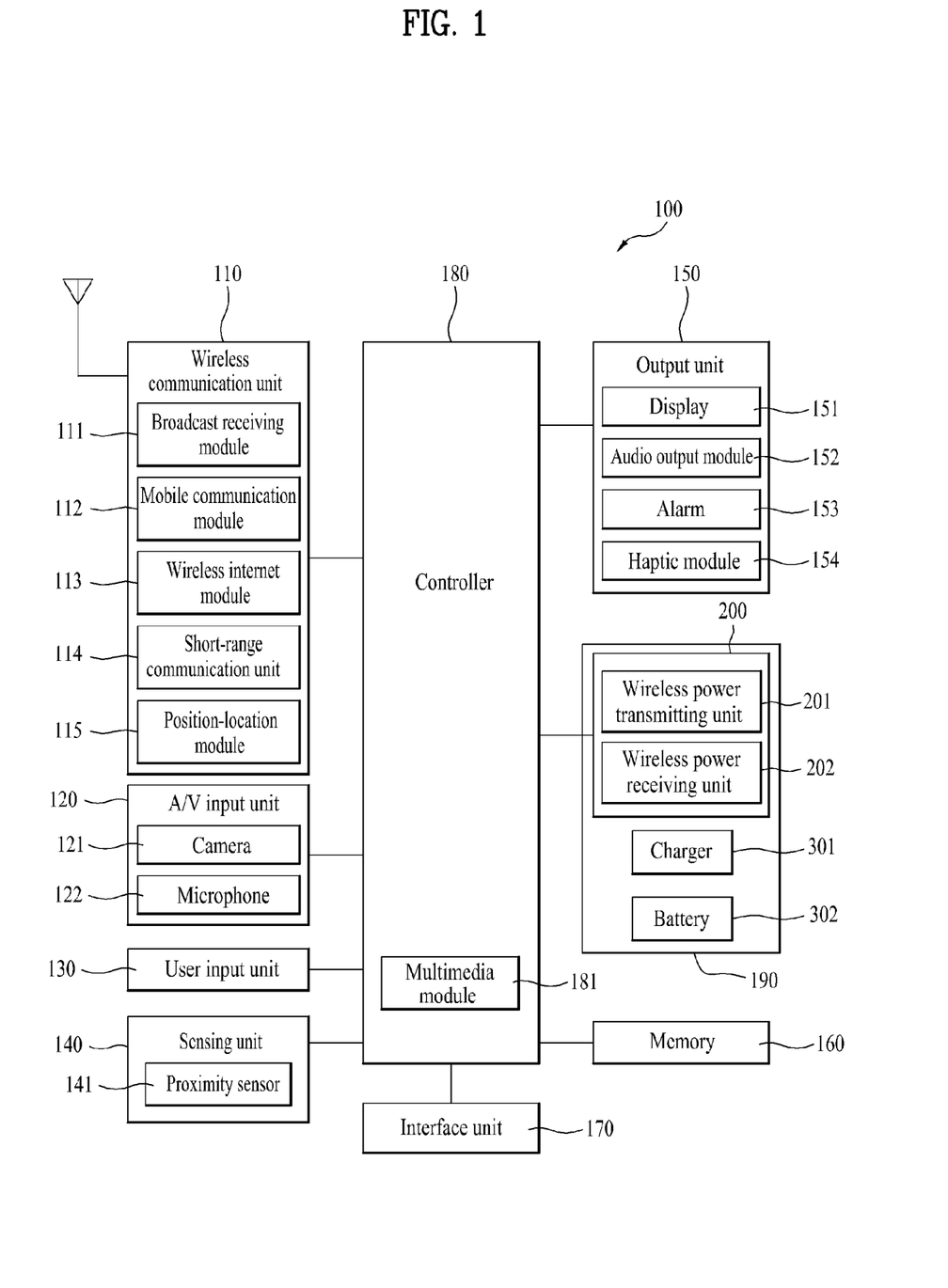
FIG. 1 is a block diagram of a mobile terminal according to one embodiment of the present invention.

FIG. 1 is a block diagram of a mobile terminal 100 in accordance with an embodiment of the present invention. With reference to FIG. 1, the mobile terminal 100 includes a wireless communication unit 110, an A/V (audio/video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. More or fewer components may be implemented according to various embodiments.

The wireless communication unit 110 typically includes one or more components which permit wireless communication between the mobile terminal 100 and a wireless communication system or network within which the mobile terminal 100 is located. For instance, the wireless communication unit 110 can include a broadcast receiving module 111, a mobile communication module 112, a wireless Internet module 113, a short-range communication module 114, and a position-location module 115.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided in the mobile terminal 100 to facilitate simultaneous reception of at least two broadcast channels or broadcast channel switching.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and an electronic service guide (ESG) of digital video broadcast-handheld (DVB-H).

The broadcast receiving module 111 may be configured to receive broadcast signals transmitted from various types of broadcast systems. By non-limiting example, such broadcasting systems may include digital multimedia broadcasting-terrestrial (DMB-T), digital multimedia broadcasting-satellite (DMB-S), digital video broadcast-handheld (DVB-H), digital video broadcast-convergence of broadcasting and mobile services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 111 can be configured to be suitable for other broadcasting systems as well as the above-noted digital broadcasting systems.

The broadcast signal and/or broadcast associated information received by the broadcast receiving module 111 may be stored in a suitable device, such as the memory 160.

The mobile communication module 112 transmits/receives wireless signals to/from one or more network entities (e.g., a base station, an external terminal, and/or a server) via a mobile network such as GSM (Global System for Mobile communications), CDMA (Code Division Multiple Access), or WCDMA (Wideband CDMA). Such wireless signals may carry audio, video, and data according to text/multimedia messages.

The wireless Internet module 113 supports Internet access for the mobile terminal 100. This module may be internally or externally coupled to the mobile terminal 100. The wireless Internet technology can include WLAN (Wireless LAN), Wi-Fi, Wibro™ (Wireless broadband), Wimax™ (World Interoperability for Microwave Access), HSDPA (High Speed Downlink Packet Access), GSM, CDMA, WCDMA, or LTE (Long Term Evolution).

Wireless Internet access by Wibro™, HSPDA, GSM, CDMA, WCDMA, or LTE is achieved via a mobile communication network. In this regard, the wireless Internet module 113 may be considered as being a kind of the mobile communication module 112 to perform the wireless Internet access via the mobile communication network.

The short-range communication module 114 facilitates relatively short-range communications. Suitable technologies for implementing this module include radio frequency identification (RFID), infrared data association (IrDA), ultra-wideband (UWB), as well as the networking technologies commonly referred to as Bluetooth™ and ZigBee™, to name a few.

The position-location module 115 identifies or otherwise obtains the location of the mobile terminal 100. According to one embodiment, this module may be implemented with a global positioning system (GPS) module. The GPS module 115 is able to precisely calculate current 3-dimensional position information based on at least longitude, latitude or altitude and direction (or orientation) by calculating distance information and precise time information from at least three satellites and then applying triangulation to the calculated information. Location information and time information are calculated using three satellites, and errors of the calculated location position and time information are then amended (or corrected) using another satellite. In addition, the GPS module 115 is able to calculate speed information by continuously calculating a real-time current location.

With continued reference to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. Furthermore, the processed image frames can be displayed on the display 151.

The image frames processed by the camera 121 can be stored in the memory 160 or can be transmitted to an external recipient via the wireless communication unit 110. Optionally, at least two cameras 121 can be provided in the mobile terminal 100 according to the environment of usage.

The microphone 122 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 112 in a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, and a jog switch.

The sensing unit 140 provides sensing signals for controlling operations of the mobile terminal 100 using status measurements of various aspects of the mobile terminal. For instance, the sensing unit 140 may detect an open/closed status of the mobile terminal 100, the relative positioning of components (e.g., a display and keypad) of the mobile terminal 100, a change of position (or location) of the mobile terminal 100 or a component of the mobile terminal 100, a presence or absence of user contact with the mobile terminal 100, and an orientation or acceleration/deceleration of the mobile terminal 100. As an example, a mobile terminal 100 configured as a slide-type mobile terminal is considered. In this configuration, the sensing unit 140 may sense whether a sliding portion of the mobile terminal is open or closed. According to other examples, the sensing unit 140 senses the presence or absence of power provided by the power supply unit 190, and the presence or absence of a coupling or other connection between the interface unit 170 and an external device. According to one embodiment, the sensing unit 140 can include a proximity sensor 141.

The output unit 150 generates output relevant to the senses of sight, hearing, and touch. Furthermore, the output unit 150 includes the display 151, an audio output module 152, an alarm unit 153, a haptic module 154, and a projector module 155.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the displays can be implemented in a transparent or optical transmittive type, i.e., a transparent display. A representative example of the transparent display is the TOLED (transparent OLED). A rear configuration of the display 151 can be implemented as the optical transmittive type as well. In this configuration, a user can see an object located at the rear of a terminal body on a portion of the display 151 of the terminal body.

At least two displays 151 can be provided in the mobile terminal 100 in accordance with one embodiment of the mobile terminal 100. For instance, a plurality of displays can be arranged to be spaced apart from each other or to form a single body on a single face of the mobile terminal 100. Alternatively, a plurality of displays can be arranged on different faces of the mobile terminal 100.

If the display 151 and a sensor for detecting a touch action (hereinafter called 'touch sensor') are configured as a mutual layer structure (hereinafter called 'touchscreen'), the display 151 is usable as an input device as well as an output device. In this instance, the touch sensor can be configured as a touch film, a touch sheet, or a touchpad.

The touch sensor can be configured to convert pressure applied to a specific portion of the display 151 or a variation of capacitance generated from a specific portion of the display 151 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 180.

Therefore, the controller 180 is made aware when a prescribed portion of the display 151 is touched.

Referring to FIG. 1, the proximity sensor 141 can be provided at an internal area of the mobile terminal 100 enclosed by the touchscreen or around the touchscreen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 141 is more durable than a contact type sensor and also has utility broader than the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touchscreen includes the electrostatic capacity proximity sensor, it is configured to detect the proximity of a pointer using a variation of an electric field according to the proximity of the pointer. In this configuration, the touchscreen (touch sensor) can be considered as the proximity sensor.

For clarity and convenience of explanation, an action for enabling the pointer approaching the touchscreen to be recognized as placed on the touchscreen may be named 'proximity touch' and an action of enabling the pointer to actually come into contact with the touchscreen may be named 'contact touch'. In addition, a position, at which the proximity touch is made to the touchscreen using the pointer, may mean a position of the pointer vertically corresponding to the touchscreen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touchscreen.

The audio output module 152 functions in various modes including a call-receiving mode, a call-placing mode, a recording mode, a voice recognition mode, and a broadcast reception mode to output audio data which is received from the wireless communication unit 110 or is stored in the memory 160. During operation, the audio output module 152 outputs audio relating to a particular function (e.g., call received, message received). The audio output module 152 may be implemented using one or more speakers, buzzers, other audio producing devices, and combinations of these devices.

The alarm unit 153 outputs a signal for announcing the occurrence of a particular event associated with the mobile terminal 100. Typical events include a call received, a message received and a touch input received. The unit 153 is able to output a signal for announcing the event occurrence by way of vibration as well as video or audio signal. The video or audio signal can be output via the display 151 or the audio output module 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. The strength and pattern of the vibration generated by the haptic module 154 are controllable. For instance, different vibrations can be output by being synthesized together or can be output in sequence.

The haptic module 154 is able to generate various tactile effects as well as the vibration. For instance, the haptic module 154 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device.

The haptic module 154 can be implemented to enable a user to sense the tactile effect through a muscle sense of a finger or an arm as well as to transfer the tactile effect through direct contact. Optionally, at least two haptic modules 154 can be provided in the mobile terminal 100 in accordance with an embodiment of the mobile terminal 100.

The memory 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 160.

Moreover, data for various patterns of vibration and/or sound output in response to a touch input to the touchscreen can be stored in the memory 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 100 is able to operate in association with a web storage for performing a storage function of the memory 160 on the Internet.

The interface unit 170 may be implemented to couple the mobile terminal 100 with external devices. The interface unit 170 receives data from the external devices or is supplied with power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 100 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectable to the mobile terminal 100 via the corresponding port.

When the mobile terminal 100 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, and video calls. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by various components of the mobile terminal 100. The power may be internal power, external power, or combinations of internal and external power.

FIG. 1 also illustrates the mobile terminal 100 including a wireless power transceiving unit 200 having a wireless power transmitting unit 201, a wireless power receiving unit 202, a charger 301 and a battery 302.

Various embodiments described herein may be implemented in a computer-readable medium using, for example, computer software, hardware, or some combination of computer software and hardware. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which performs one or more of the functions and operations described herein. The software codes can be implemented with a software application written in any suitable programming language and may be stored in memory such as the memory 160, and executed by a controller or processor, such as the controller 180.

Figure 2A:
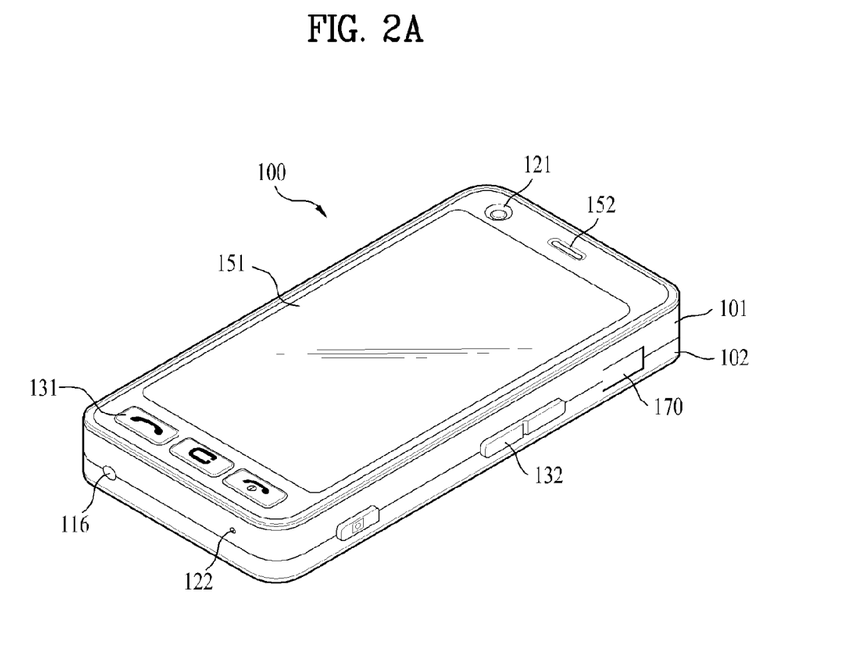
FIG. 2A is a front perspective view of a mobile terminal according to one embodiment of the present invention.

FIG. 2A is a front perspective view of a mobile terminal according to one embodiment of the present invention.

The mobile terminal 100 illustrated in FIG. 2A has a bar type terminal body. However, the mobile terminal 100 may be implemented in a variety of different configurations. Examples of such configurations include folder-type, slide-type, rotational-type, swing-type and combinations thereof. For ease of description, the following disclosure will primarily relate to a bar-type mobile terminal 100. However, it is understood that such disclosure may apply equally to other types of mobile terminals.

Referring to FIG. 2A, the mobile terminal 100 includes a case (a casing, housing, or cover) constituting an exterior of the mobile terminal. In the present embodiment, the case can be divided into a front case 101 and a rear case 102. Various electric/electronic parts are loaded in a space (volume) provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output module 152, a camera 121, manipulating units 131 and 132, a microphone 122, and an interface unit 170 can be provided at the terminal body, and more particularly, at the front case 101. Manipulating units 131 and 132 are part of the user input unit 130 (see FIG. 1).

The display 151 occupies most of a main face of the front case 101. The audio output module 152 and the camera 121 are provided at an area adjacent to an end portion of the display 151, while the manipulating unit 131 and the microphone 122 are provided at an area adjacent to the other end portion of the display 151. The manipulating unit 132 and the interface unit 170 can be provided at lateral sides of the front and rear cases 101 and 102.

The user input unit 130 is manipulated (operated) to receive a command for controlling an operation of the terminal 100. Furthermore, the user input unit 130 may include a plurality of manipulating units 131 and 132. The manipulating units 131 and 132 can be referred to as a manipulating portion and may adopt any tactile mechanism that enables a user to perform a manipulation action by touch.

Content input by manipulating units 131 and 132 can be divided between the two. For instance, a command such as start, end, and scroll is input to first manipulating unit 131. Furthermore, a command for a volume adjustment of sound output from the audio output module 152, or a command for a switching to a touch recognizing mode of the display 151 can be input to second manipulating unit 132.

Figure 2B:
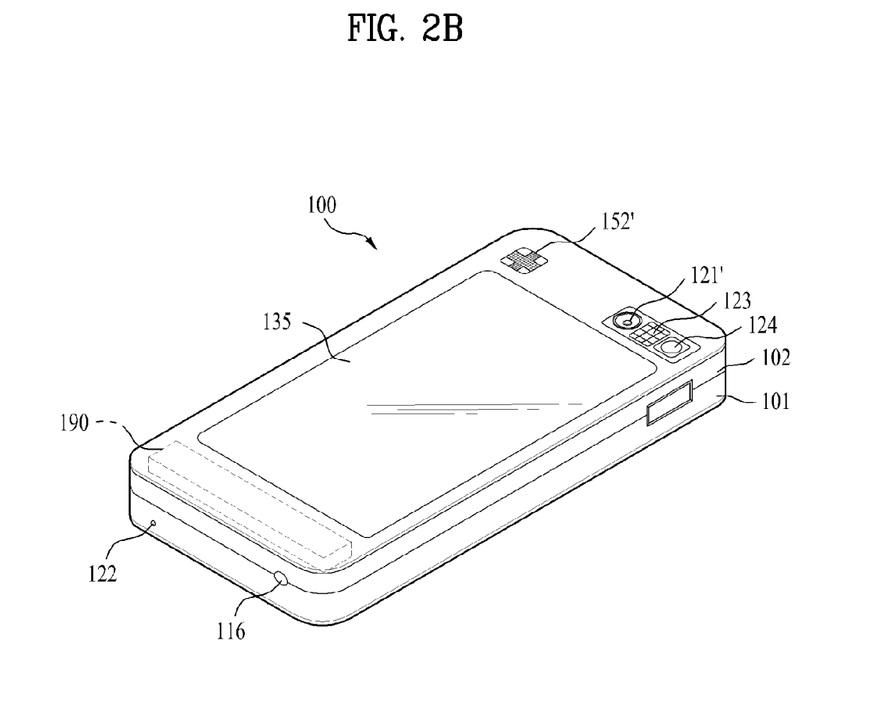
FIG. 2B is a rear perspective view of a mobile terminal according to one embodiment of the present invention.

FIG. 2B is a rear perspective view of the terminal of FIG. 2A. Referring to FIG. 2B, a camera 121' can be additionally provided at a rear of the terminal body, and more particularly, at the rear case 102. The camera 121' captures images along a direction that is substantially opposite to that of the camera 121 (see FIG. 2A) and may have a pixel resolution different from that of the camera 121.

According to one embodiment, for instance, the camera 121 has a relatively low number of pixels sufficient to capture and transmit a picture of a user's face for a video call, while the camera 121' has a relatively high number of pixels for capturing a photograph (e.g., a finer detail photograph) of a general subject. Furthermore, each of the cameras 121 and 121' can be installed on the terminal body to be rotated or popped up.

A flash 123 and a mirror 124 are additionally provided adjacent to the camera 121'. The flash 123 projects light toward a subject for photographing the subject using the camera 121'. When a user attempts to take a picture of the user (self-photography) using the camera 121', the mirror 124 enables the user to view the user's face as reflected by the mirror 124.

An additional audio output module 152' can be provided at the rear of the terminal body. The additional audio output module 152' is for implementing a stereo function together with the audio output module 152 (see FIG. 2A) and may be used for implementation of a speakerphone mode when speaking over the tee urinal.

A broadcast signal-receiving antenna 116 can be additionally provided at the lateral side of the terminal body as well as an antenna for communication. The broadcast signal receiving antenna may constitute a portion of the broadcast receiving module 111 (see FIG. 1) and be retractable into the terminal body.

A power supply unit 190 for supplying a power to the terminal 100 is provided at the terminal body. Furthermore, the power supply unit 190 can be configured to be built within the terminal body. Alternatively, the power supply unit 190 can be configured to be detachably connected to the terminal body.

A touchpad 135 for detecting a touch can be additionally provided at the rear case 102. The touchpad 135 can be configured as a light transmittive type similar to the display 151. In this instance, if the display 151 is configured to output visual information from both of its faces, the visual information is viewable via the touchpad 135 as well. The information output from both of the faces can be entirely controlled by the touchpad 135.

Alternatively, a display is further provided for the touchpad 135 so that a touchscreen can be provided at the rear case 102 as well.

The touchpad 135 is activated by interconnecting with the display 151 of the front case 101. The touchpad 135 can be provided at the rear of the display 151 to extend parallel to the display 151. The touchpad 135 can have a size equal to or smaller than the size of the display 151.

In the disclosure presented herein, embodiments related to a method, which can be implemented in the mobile terminal 100, for controlling the mobile terminal are described with reference to the accompanying drawings.

Figure 3:
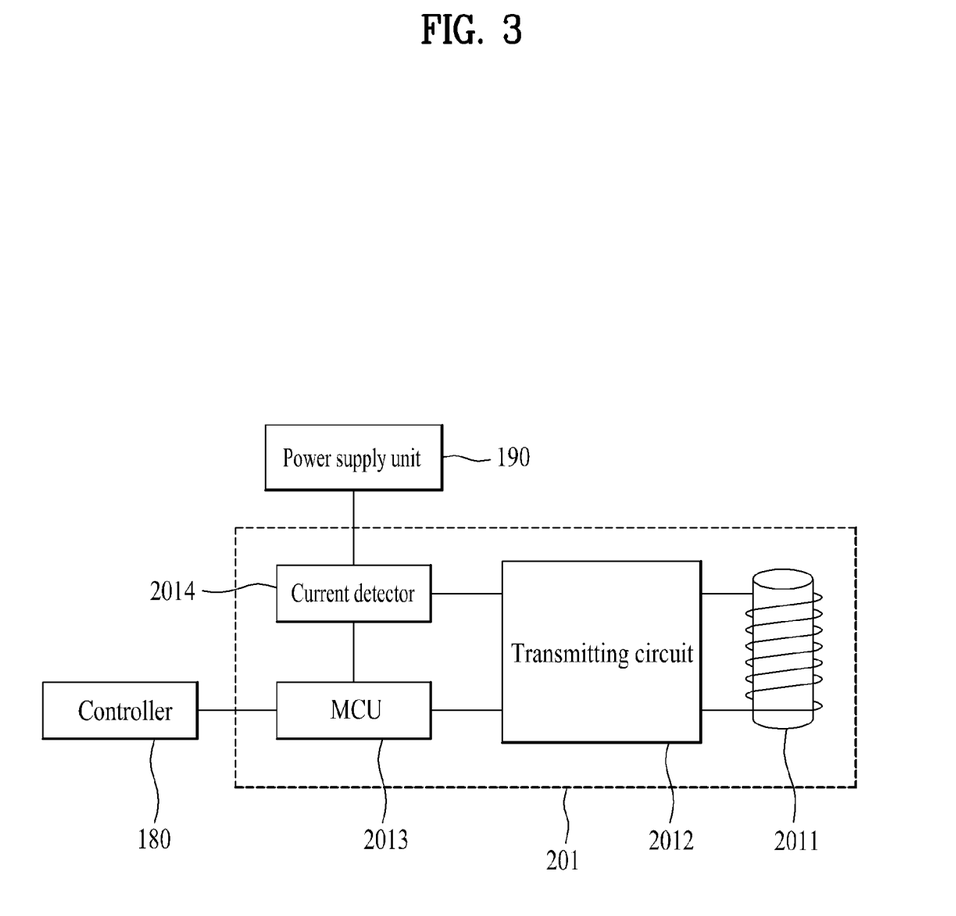
FIG. 3 is a block diagram of a wireless power transmitting unit according to one embodiment of the present invention.

FIG. 3 is a block diagram of a wireless power transmitting unit 201 according to one embodiment of the present invention. Referring to FIG. 3, the wireless power transmitting unit 201 may include a transmitting coil 2011, a transmitting circuit 2012, a transmission microcontroller unit 2013, a current detector 2014 and the like.

The transmitting coil 2011 plays a role as an induction coil to transmit a magnetic field. If a current is applied from the transmitting circuit 2012, the transmitting coil 2012 generates a magnetic field in proportion to an amount of a current that flows by the electromagnetic induction rule. Thus, the generated magnetic field may be externally transmitted from one mobile terminal, by which energy can be transmitted to another mobile terminal.

An output of the transmitting circuit 2012 is connected with the transmitting coil 2011 and an input of the transmitting circuit 2012 is connected to the transmission microcontroller unit 2013. Hence, the transmitting circuit 2012 receives an input of a control signal from the transmission microcontroller unit 2013 and then transmits a signal applied to the transmitting coil 2011.

Under the control of the controller 180, the transmission microcontroller unit (MCU) 2013 controls the transmitting circuit 2012 based on a numerical value of a current applied to the transmitting circuit 2012 from the current detector 2014. The overall control of the transmission microcontroller unit 2013 is performed by the controller 180. In addition, the transmission microcontroller unit 2013 can control an amplitude, frequency and phase of a current to be applied to the transmitting coil 2011. In this instance, based on the amount of the current detected by the current detector 2014, the transmission microcontroller unit 2013 can modify the amplitude, frequency or phase of the current.

Meanwhile, when the controller 180 controls the transmission microcontroller unit 2013, if the wireless communication unit receives a request signal from a terminal side of wirelessly receiving a power, the controller 180 can control the transmission microcontroller unit 2013 based on the received request signal. For instance, if the power receiving terminal side makes a request for applying a signal having a current width of 1 (A), a voltage amplitude of 15 (V), and/or a frequency of 100 kHz, the wireless communication unit 110 delivers this signal to the controller 180. Based on the delivered signal, the controller 180 can transmit a control signal to the transmission microcontroller unit 2013.

The current detector 2014 detects an amount of a current flowing into the transmitting circuit 2012 from the power supply unit 190 and then transmits the detected amount to the transmission microcontroller unit 2013.

Figure 4:
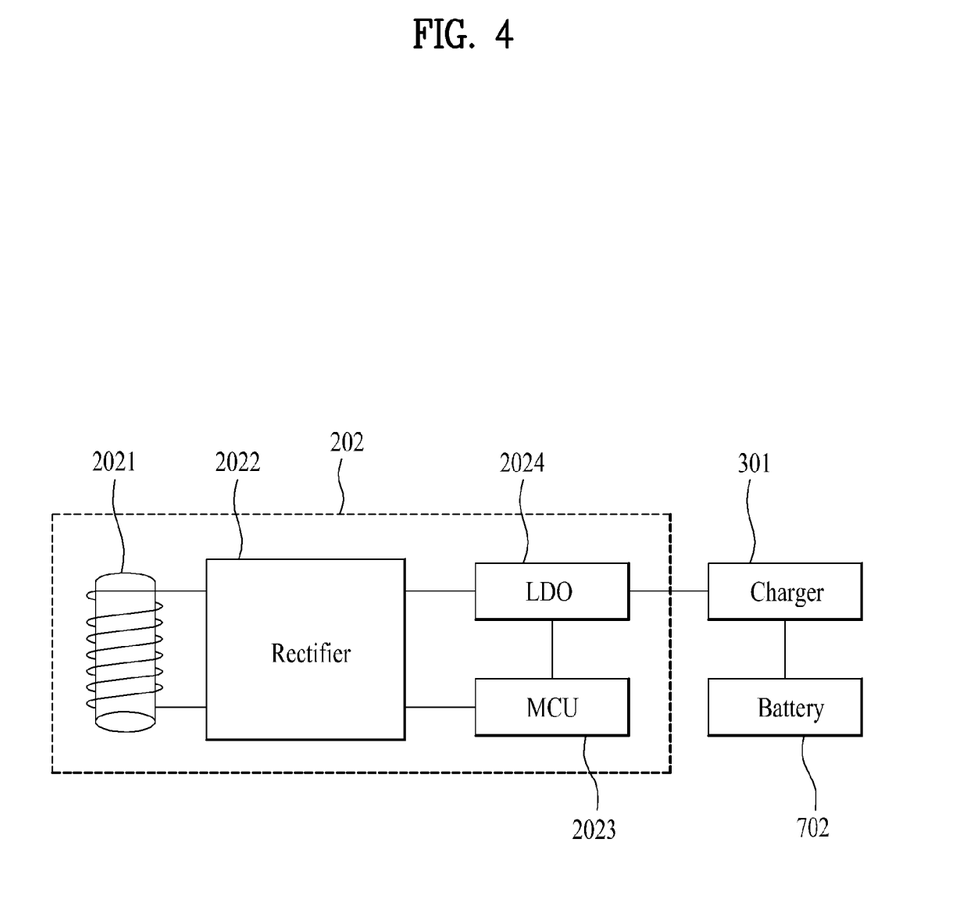
FIG. 4 is a block diagram of a wireless power receiving unit according to one embodiment of the present invention.

FIG. 4 is a block diagram of a wireless power receiving unit 202 according to one embodiment of the present invention. Referring to FIG. 4, the wireless power receiving unit 202 may include a receiving coil 2021, a rectifier 2022, a reception microcontroller unit 2023 and an LDO (low dropout) 2024.

The receiving coil 2021 plays a role as an induction coil and generates an induced current using a magnetic field coming from outside. In doing so, an induced electromotive force is generated in proportion to a variation of the magnetic field by Faraday's rule and a current is generated using the electromotive force.

The rectifier 2022 plays a role in converting the current generated from the receiving coil 2021 to a direct current. The rectifier 2022 converts a current generated from the receiving coil 2021 to a direct current, provides the converted current to a charger 301 to save it in a chargeable battery 302.

The reception microcontroller unit 2023 is controlled by the controller 180 and controls the rectifier 2022. If receiving an input of a signal for charging the battery from the controller 180, the reception microcontroller unit 2023 controls the rectifier 2022 to provide the current to the charger 301.

The LDO 2024 is connected with an output terminal to play a role in removing an excessive voltage of the output from the rectifier 2022. In addition, an output of the LDO 2024 is connected to the charger 301.

Figure 5:
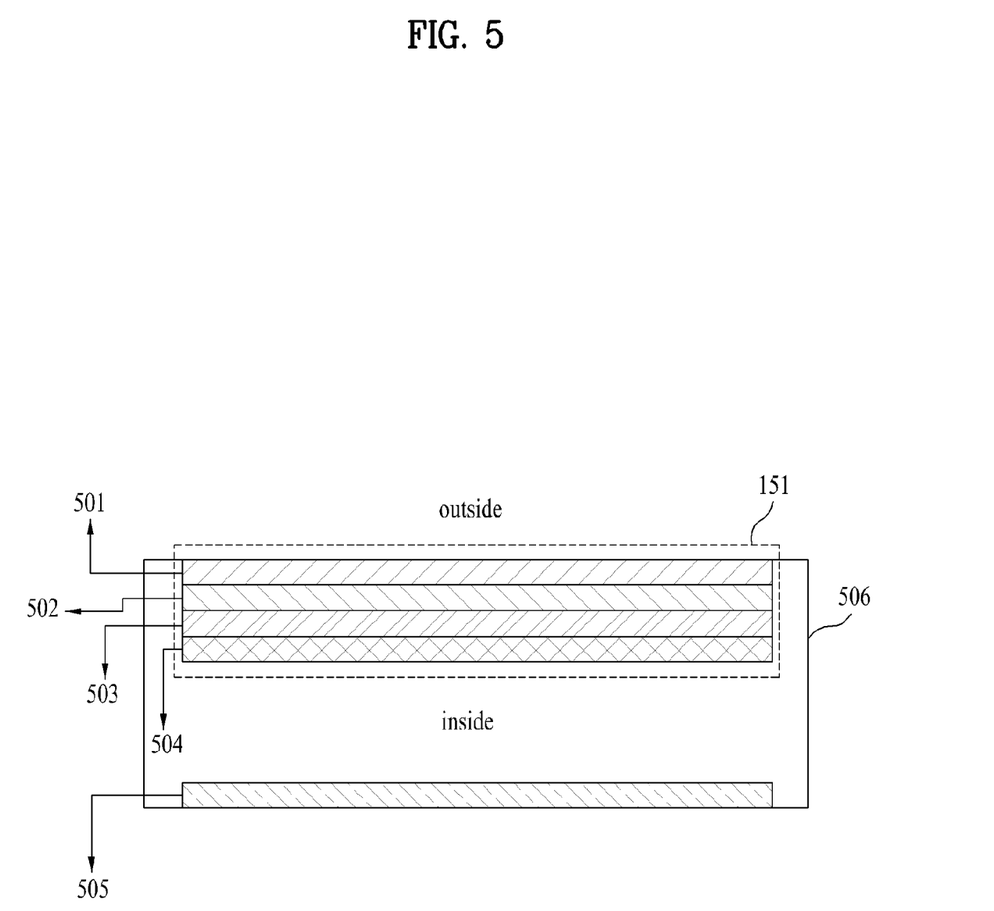
FIG. 5 is a cross-sectional diagram of a mobile terminal and a display unit thereof according to one embodiment of the present invention.

FIG. 5 is a cross-sectional diagram of a mobile terminal and a display unit 151 thereof according to one embodiment of the present invention. Referring to FIG. 5, a cross-section of the display unit 151 includes a tempered glass 501, an LCD 502, an LCD reinforcement panel 503 and a shielding member 504, which are enumerated from an outer side. In particular, the display unit 151 may be provided within an exterior case 506 of the mobile terminal.

The tempered glass 501 includes a glass configured to contact with one face of the LCD 502 to protect against external shock. The LCD 502 is a liquid crystal display configured to display information processed by the mobile terminal 100. The LCD reinforcement panel 503 is the panel configured to prevent deformation of the LCD by contacting with the other face of the LCD 502. According to one embodiment of the present invention, the transmitting coil 2011 or the receiving coil 2021 is included within the LCD reinforcement panel 503 or be positioned by contacting with the LCD reinforcement panel 503. When one of the transmitting coil 2011 and the receiving coil 2021 is positioned in this manner, the other one of the transmitting coil 2011 and the receiving coil 2021 may be situated on an opposing side 505 of the exterior case 506.

The shielding member 504 prevents a magnetic field from flowing into an inside of the mobile terminal 100 by cutting off the magnetic field generated from the transmitting coil 2011 or the magnetic field received externally. Because the inside of the mobile terminal 100 is constructed with an integrated electric/electronic circuit, it is possible for the circuit to experience its malfunction momentarily or permanently due to the influence of the magnetic field. Thus, it is preferable to prevent the influx of the magnetic field.

Figure 6:
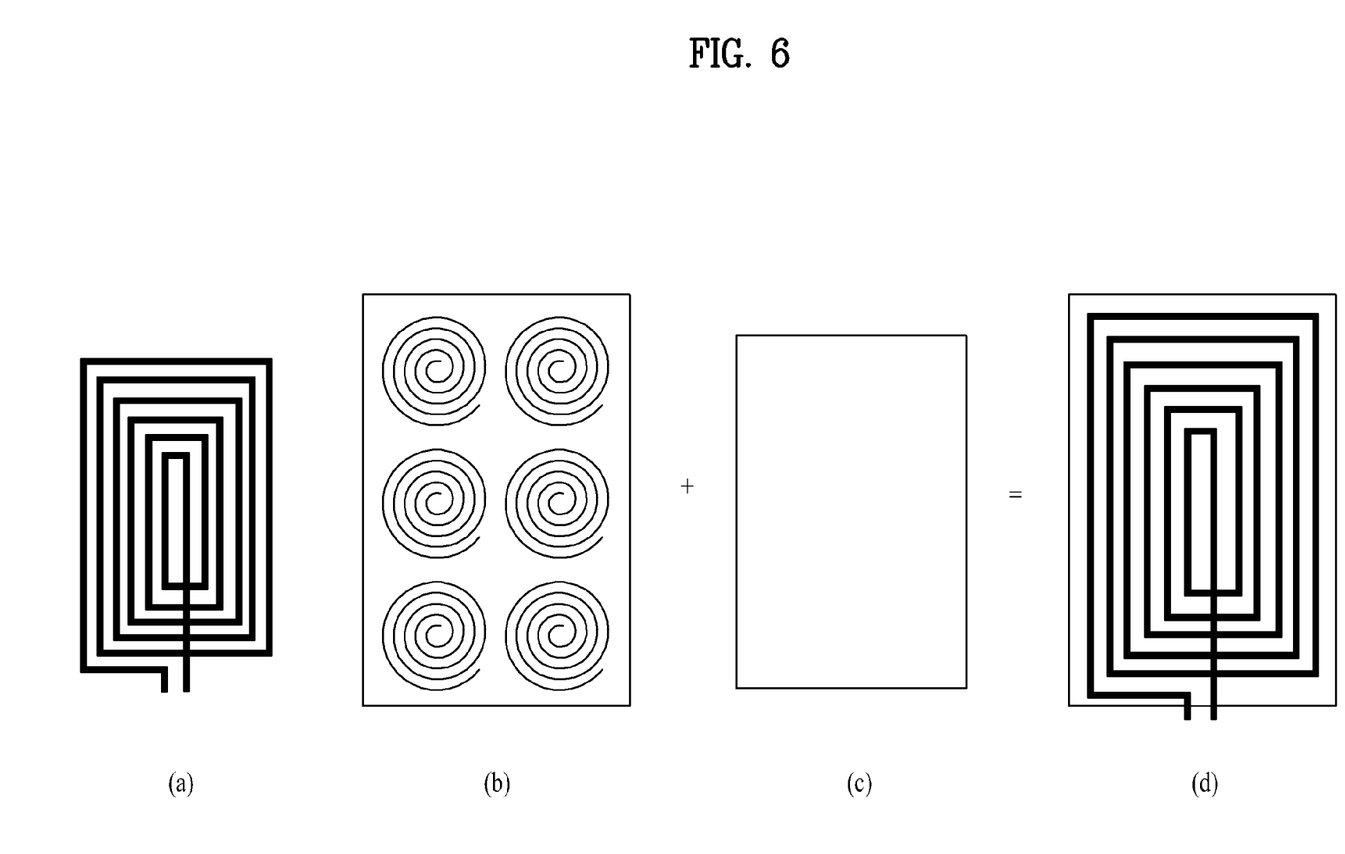
FIG. 6 is a diagram for shapes of transmitting and receiving coils and a configuration of the transmitting/receiving coil combined with a reinforcement panel according to one embodiment of the present invention.

FIG. 6 is a diagram illustrating shapes of transmitting and receiving coils 2011 and 2021 and a configuration of the transmitting/receiving coil combined with a reinforcement panel according to one embodiment of the present invention.

Referring to FIG. 6, as mentioned in the foregoing description with reference to FIG. 5, in order for the transmitting coil 2011 or the receiving coil 2021 to be situated within or contact with the LCD reinforcement panel 503, the coil has a shape of a thin panel (FIG. 6(a), FIG. 6(b)). However, the shape of the transmitting coil 2011 or the receiving coil 2021 is non-limited by the shapes shown in FIG. 6.

FIG. 6(c) shows the LCD reinforcement panel 503 shown in FIG. 5. Because the LCD reinforcement panel 503 prevents deformation of the LCD 502, it can be rigid. Moreover, because the LCD reinforcement panel 503 focuses a magnetic field by being combined with the transmitting coil 2011 or the receiving coil 2021, it is made of a material having high magnetic permeability. Thus, the LCD reinforcement panel 503 may be prepared with a ferrite or amorphous material having a magnetic property, by which the material of the LCD reinforcement panel 503 is non-limited.

Moreover, because sandust has both rigidity and magnetic property, the LCD reinforcement panel 503 may be made of sandust. A magnetic body manufactured as a product name FINEMET by HITACHI Corporation is the material having a very fine crystalline structure and has high rigidity and magnetic property and may be usable as a material of the LCD reinforcement panel 503.

FIG. 6(d) shows that the LCD reinforcement panel 503 and a coil are combined together. In order to combine the LCD reinforcement panel 503 and the transmitting coil 2011 or the receiving coil 2021 together, the corresponding coil may be embedded in the LCD reinforcement panel 503 when fabricating the LCD reinforcement panel 503. Alternatively, the corresponding coil may be attached to one face of the completed LCD reinforcement panel 503.

Thus, according to one embodiment of the present invention, the transmitting coil 2011 or the receiving coil 2021 is attached to an inside or one face of the LCD reinforcement panel 503. Because an internal structure of a mobile communication terminal is intensively configured with devices supportive of functions of the mobile communication terminal, it is difficult to secure a space for loading the transmitting coil 2011 or the receiving coil 2021 therein. Yet, according to one embodiment of the present invention, as the transmitting coil 2011 or the receiving coil 2021 is arranged within the LCD reinforcement panel 503 or attached to one face of the LCD reinforcement panel 503, the following advantages and/or features may be attained.

First of all, because a volume or space occupied by the transmitting coil 2011 or the receiving coil 2021 is minimized, the transmitting coil 2011 or the receiving coil 2021 does not affect an overall volume of the mobile terminal 100. As the LCD reinforcement panel 503 is the component protecting the LCD 502, it has nothing to do with a presence or non-presence of a coil. Hence, if the coil is arranged within the LCD reinforcement panel 503, it can minimize the volume occupied by the corresponding coil.

Secondly, it can focus a magnetic field generated from a coil in accordance with a material of the LCD reinforcement panel 503. In particular, as mentioned in the foregoing description, when a material of the LCD reinforcement panel 503 includes a magnetic body, if a coil is arranged within or in the vicinity of the magnetic body, a magnetic field generated from the coil can be focused or an externally received magnetic field can be focused on the corresponding coil.

Thirdly, the transmitting coil 2011 or the receiving coil 2021 may supplement a role of the LCD reinforcement panel 503 using the rigidity of the coil together with the rigidity of the LCD reinforcement panel 503.

According to one embodiment of the present invention, the transmitting coil 2011 or the receiving coil 2021 can be integrated into a single coil. In particular, the wireless power transmitting unit 201 and the wireless power receiving unit 202 can be configured using a single coil. Yet, if so, the power transmission of the wireless power transmitting unit 201 and the power reception of the wireless power receiving unit 202 may not be performed at the same time. This is because a single coil is unable to perform both reception and transmission at the same time.

According to another embodiment of the present invention, the transmitting coil 2011 or the receiving coil 2021 may be provided to different locations, respectively. In particular, as mentioned with reference to FIG. 5, if one of the transmitting coil 2011 or the receiving coil 2021 is situated at the LCD reinforcement panel 503, the other may be situated at the opposing side 505 of the exterior case 506.

In this instance, the magnetic field of the transmitting coil 2011 and the magnetic field of the receiving coil 2021 may not be mutually affected owing to the shielding member 504 shown in FIG. 5. In particular, in the mobile terminal 100, the transmitting coil 2011 is arranged in one direction with reference to the shielding member 504 in the middle, while the receiving coil 2012 is arranged in another direction. Moreover, the shielding member 504 may play a role in preventing malfunctions of internal devices of the mobile terminal 100 by cutting off the magnetic field.

Figure 7A:
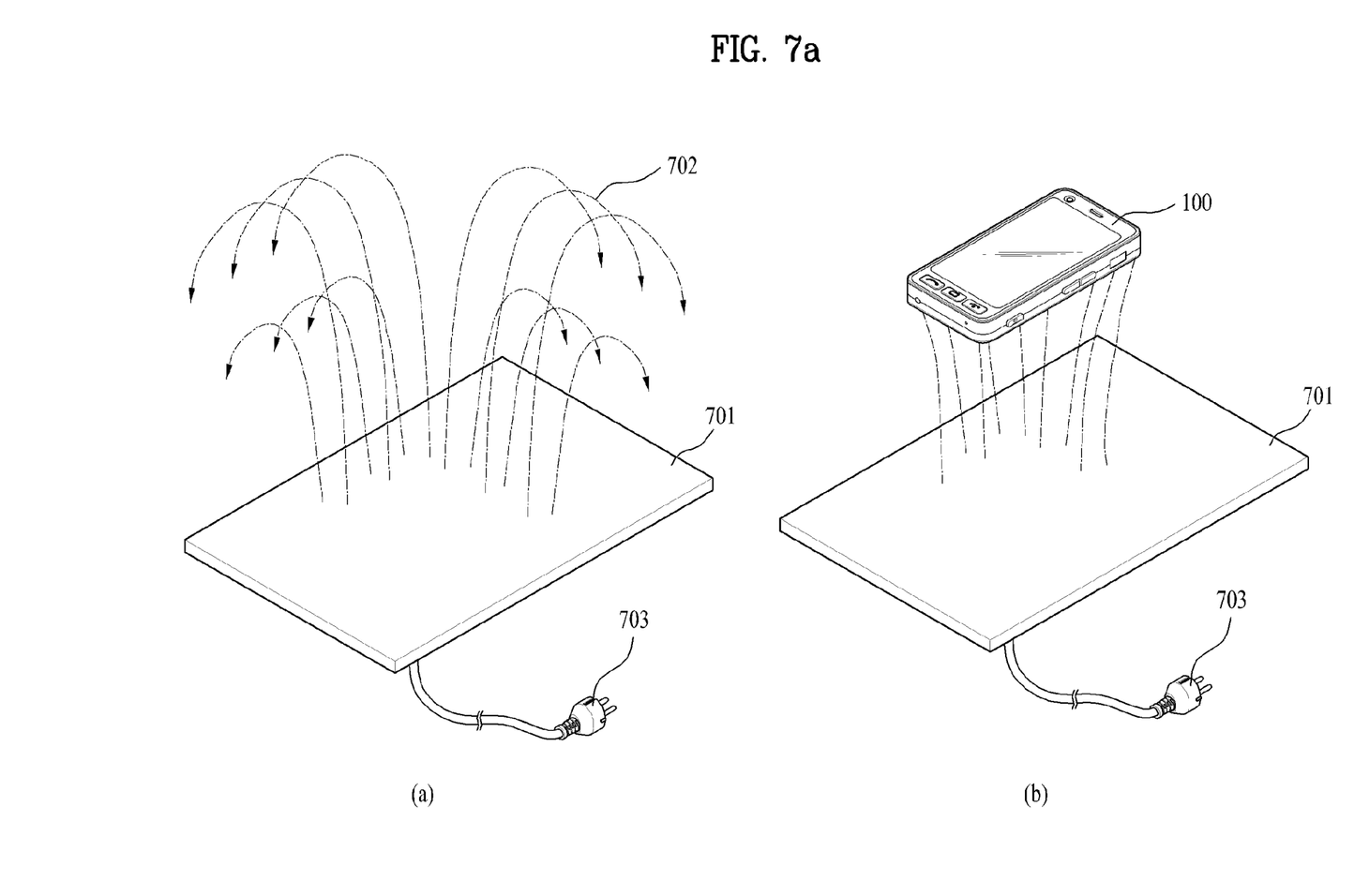
FIGS. 7A and 7B is diagram to describe a method for one mobile terminal to transmit a power to another mobile terminal in the course of receiving a power by wireless transmission according to one embodiment of the present invention.
Figure 7B:
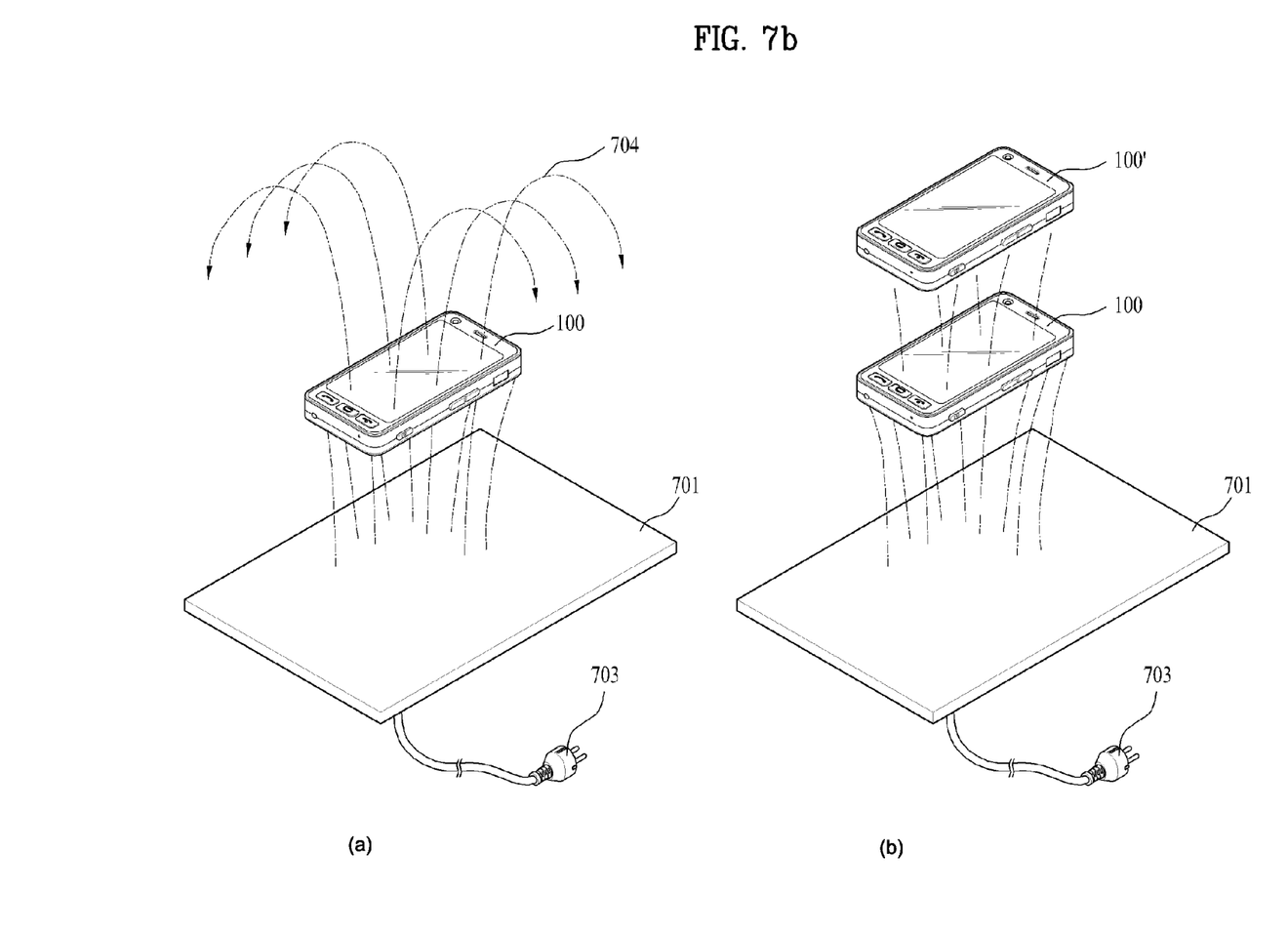

FIG. 7 is diagram illustrating a method for one mobile terminal (hereinafter named a $1^{st}$ mobile terminal) 100 to transmit a power to another mobile terminal (hereinafter named a $2^{nd}$ mobile terminal) 100' while receiving a power by wireless transmission according to one embodiment of the present invention. In this instance, the transmitting coil 2011 or the receiving coil 2021 should be configured in the mobile terminal 100 with coils different from each other, respectively.

FIG. 7A(a) shows a magnetic field (hereinafter named a $1^{st}$ magnetic field) 702 generated from a wireless charging pad 701. Referring to FIG. 7A(a), the wireless charging pad 701 generates the $1^{st}$ magnetic field 702 by being supplied with a power from a power cord 703. The generated $1^{st}$ magnetic field 702 is used to transmit a power to the $2^{nd}$ mobile terminal 100'.

FIG. 7A(b) shows that the $1^{st}$ magnetic field 702, which is generated when the mobile terminal 100 is situated in the $1^{st}$ magnetic field 702 generated by the wireless charging pad 701, does not permeate through the mobile terminal 100. This is because the shielding member 504 provided to the display unit 151 of the mobile terminal 100 prevents the permeation of the magnetic field, as shown in FIG. 5.

Hence, when attempting to charge both of the $1^{st}$ mobile terminal 100 and the $2^{nd}$ mobile terminal 100' at the same time, superposing the $2^{nd}$ mobile terminal 100' over the $1^{st}$ mobile terminal 100 may not be suitable for charging. However, according to one embodiment of the present invention, a plurality of mobile terminals arranged by being superposed on each other can be simultaneously charged. In the following description, a method of charging a plurality of mobile terminals 100 superposed on each other simultaneously is explained.

FIG. 7B shows that the mobile terminal 100 generates a magnetic field on its own. Referring to FIG. 7B(a), the mobile terminal 100 receives a power by wireless using a magnetic field generated by the wireless charging pad 701 and simultaneously generates a magnetic field (hereinafter named a $2^{nd}$ magnetic field) 704 on its own to transmit energy to the $2^{nd}$ mobile terminal 100'. In particular, the $2^{nd}$ magnetic field 704 is being generated by applying a current to the transmitting coil 2011 situated within the $1^{st}$ mobile terminal 100. If the $2^{nd}$ mobile terminal 100' is placed at the location of generating the $2^{nd}$ magnetic field 704 as shown in FIG. 7B(b), a power can be transmitted to the $2^{nd}$ mobile terminal 100' from the $1^{st}$ mobile terminal 100. In particular, it can simultaneously perform the charging on both of the $1^{st}$ and $2^{nd}$ mobile terminals 100 and 100' superposed on each other.

Figure 8:
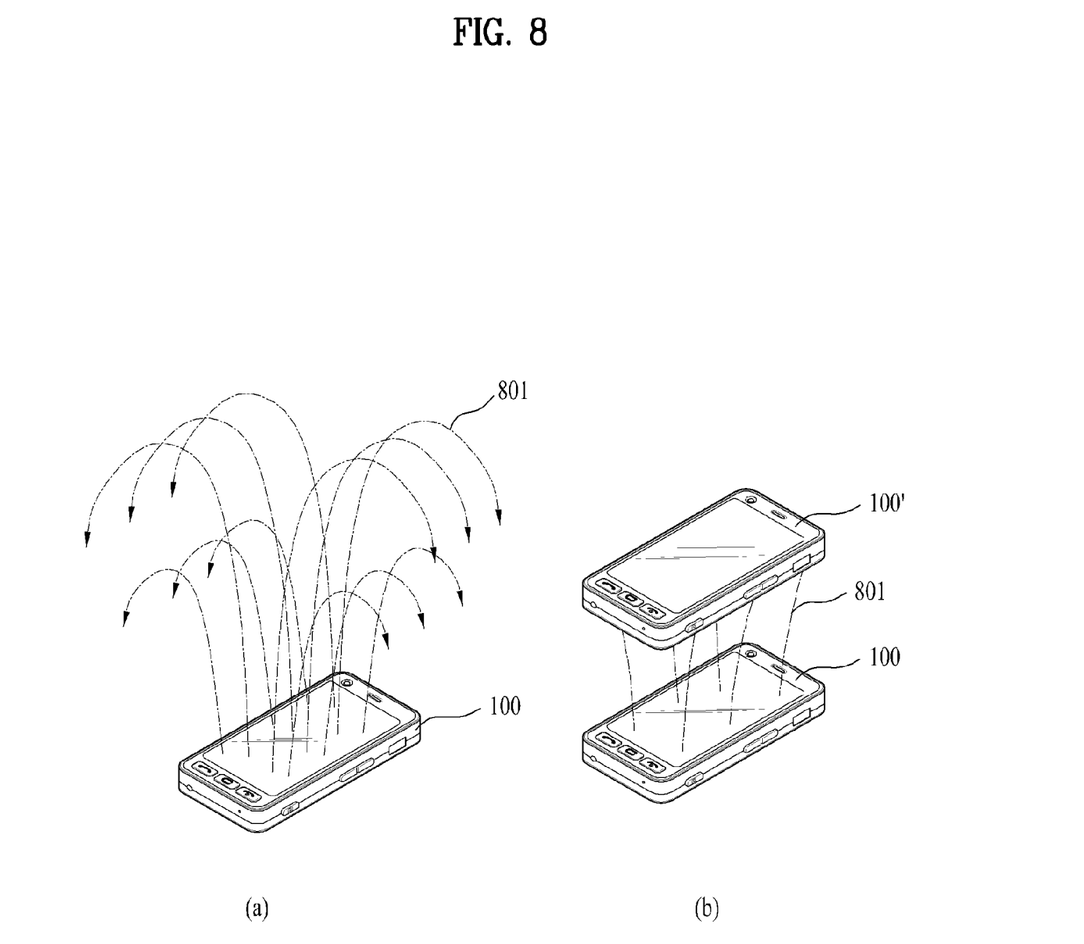
FIG. 8 is a diagram to describe a method for one mobile terminal to transmit a power to another terminal by wireless transmission according to one embodiment of the present invention.

FIG. 8 is a diagram to describe a method for one mobile terminal (hereinafter named a $1^{st}$ mobile terminal) 100 to transmit a power to another terminal (hereinafter named a $2^{nd}$ mobile terminal) 100' by wireless transmission according to one embodiment of the present invention. Referring to FIG. 8(*a*), the $1^{st}$ mobile terminal 100 generates a magnetic field 801 from the transmitting coil 2011 of the wireless power transmitting unit 201. As mentioned in the foregoing description, the magnetic field 801 is generated by the wireless power transmitting unit 201 controlling a current to flow in the transmitting coil 2011 by the electromagnetic induction rule.

If the $2^{nd}$ mobile terminal 100' is placed in the generated magnetic field 801, energy can be transported as a magnetic field to the $2^{nd}$ mobile terminal 100' by the variation of the generated magnetic field. In particular, the energy stored in the battery inside the $1^{st}$ mobile terminal 100 can be transferred to the battery inside the $2^{nd}$ mobile terminal 100'. Moreover, if a mode is switched between a transmission and reception under the control of the controller 180, energy stored in the inside battery of the $2^{nd}$ mobile terminal 100' can be transferred to the inside battery of the $1^{st}$ mobile terminal 100.

Meanwhile, referring to FIG. 8(*b*), due to the influence of the shielding member 504 provided to the display unit 151 of the mobile terminal 100, the generated magnetic field 801 is unable to penetrate the $2^{nd}$ mobile terminal 100'. In particular, when a plurality of mobile terminals 100 are arranged by being superposed on each other, it is unable to charge the mobile terminals 100 simultaneously.

Therefore, when attempting to simultaneously charge a plurality of the mobile terminals 100 by superposing the mobile terminals 100 on each other, a magnetic field should be newly generated by another mobile terminal 100', i.e., the $2^{nd}$ mobile terminal 100' shown in FIG. 8.

The $2^{nd}$ mobile terminal 100' can generate a magnetic field using the transmitting coil 2011 provided the $2^{nd}$ mobile terminal 100'. Once the $2^{nd}$ mobile terminal 100' forms the magnetic field, the $2^{nd}$ mobile terminal 100' can transmit a power to a $3^{rd}$ mobile terminal while receiving a power from the $1^{st}$ mobile terminal 100.

Figure 9:
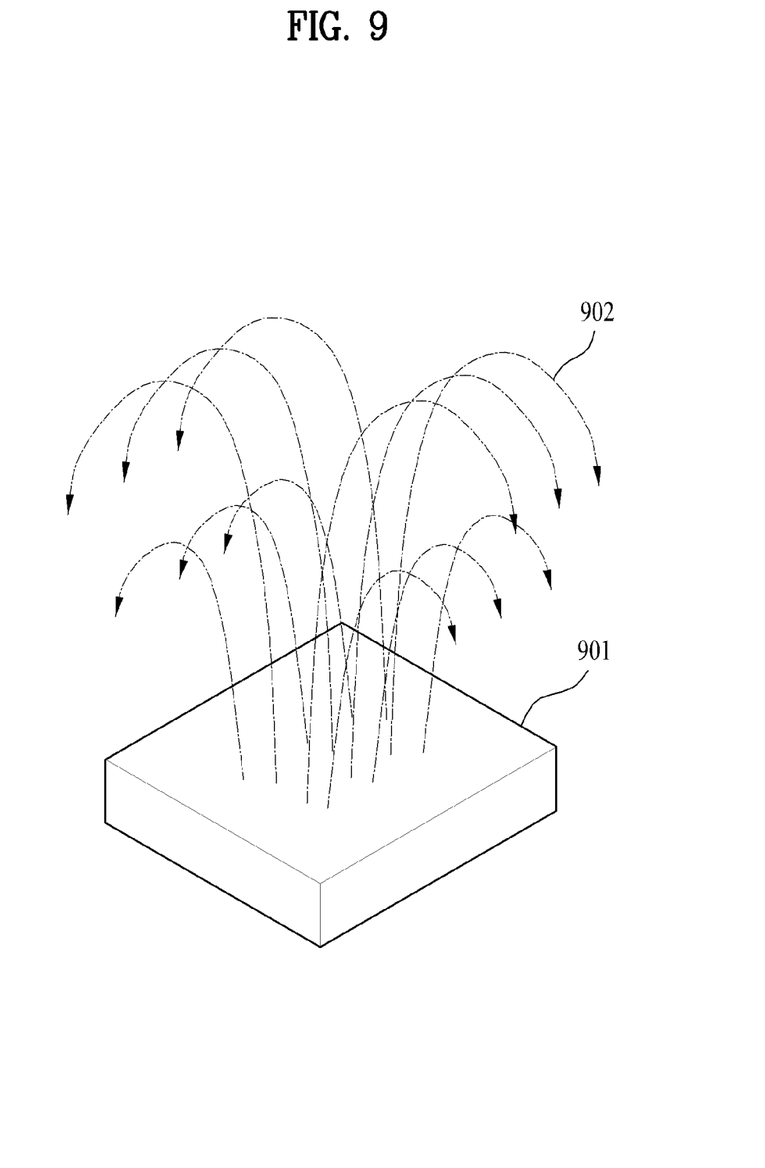
FIG. 9 is a diagram to illustrate a magnetic field generated by a portable charging device according to one embodiment of the present invention.

FIG. 9 is a diagram illustrating a magnetic field generated by a portable charging device 901 according to one embodiment of the present invention. Referring to FIG. 9, the mobile terminal 100 according to the present invention may include the portable charging device 901.

Because the portable charging device 901 includes the wireless power transceiving unit 200, it can exchange a power with another mobile terminal using a wireless charging mechanism.

The portable charging device 901 is a supplementary device configured to provide a charging function to the mobile terminal 100 by a wireless charging mechanism. The portable charging device 901 has a chargeable battery installed inside and receives a magnetic field using the wireless power receiving unit 202. The portable charging device 901 transforms the received magnetic field into a power and then stores the power as energy in the battery.

A user of the portable charging device 901 can charge the mobile terminal 100 by wireless if a charging is necessary when carrying the portable charging device 901. In particular, the portable charging device 901 generates a magnetic field using the wireless power transmitting unit 902 and then transmits a power to another mobile terminal using the generated magnetic field.

Because the portable charging device 901 transceives a power by wireless, it has the following advantages and/or features.

First of all, because the transceiving is performed by wireless, the portable charging device 901 may not need a terminal for a charging. As the portable charging device 901 does not have the charging terminal, it may be facilitated to have a waterproof function. If a waterproof structure is further provided to the portable charging device 901, a waterproof level of the portable charging device 901 may be raised.

Secondly, when the portable charging device 901 is charged or another device is charged using the portable charging device 901, the corresponding charging can be performed by wireless. Hence, it may be unnecessary to connect terminals of the two devices together after taking the portable charging device 901 out of a case or bag. Therefore, when the charging is performed, user's convenience can be enhanced.

It will be apparent to those skilled in the art that various modifications and variations can be specified into other form(s) without departing from the spirit or scope of the inventions.

The present invention mentioned in the foregoing description can be implemented in a program-recorded medium as computer-readable codes. The computer-readable media include all kinds of recording devices in which data readable by a computer are saved. The computer-readable media include ROM, RAM, CD-ROM, magnetic tapes, floppy discs, optical data storage devices, and the like for example and also include carrier-wave type implementations (e.g., transmission via Internet). In addition, the computer may include a controller 180 of a terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
   a display unit;
   a power supply unit including a chargeable battery;
   a reinforcement panel configured to prevent deformation of the display unit by contacting with one surface of the display unit;
   a wireless power transmitting unit configured to transform power supplied from the battery into a magnetic field, and to transmit the magnetic field to at least one other terminal placed within a predetermined distance from the mobile terminal;
   a wireless power receiving unit configured to receive an external magnetic field and to transform the externally received magnetic field into the power;
   a shielding member configured to cut off a magnetic field, where the shielding member is positioned between the wireless power transmitting unit and the wireless power receiving unit; and
   a controller configured to control an amount of power supplied from the battery to the wireless power transmitting unit and to charge the battery with the power transformed by the wireless power receiving unit, wherein the wireless power transmitting unit transforms the power supplied from the battery into the magnetic field by applying a current to a coil wire arranged within the reinforcement panel or contacts with one surface of the reinforcement panel.

2. The mobile terminal of claim 1, wherein the reinforcement panel comprises a magnetic body.

3. The mobile terminal of claim 2, wherein the magnetic body comprises a ferrite magnetic body.

4. The mobile terminal of claim 1, wherein the wireless power receiving unit is further configured to receive the external magnetic field via a coil-shaped wire, to generate a current voltage and current induced into the coil-shape wire, and then to transform the voltage and current into the power used to charge the battery.

5. The mobile terminal of claim 4, wherein the wireless power transmitting unit is further configured to transform the power supplied from the charged battery into the magnetic field and to said at least one other terminal, and wherein the wireless power receiving unit receives the external magnetic field from a charging pad in which the mobile terminal is placed above the charging pad, and transmits the magnetic field to said at least one other terminal superimposed with the mobile terminal and the charging pad.

6. A method of controlling a mobile terminal including a display unit, a power supply unit including a chargeable battery, and a reinforcement panel configured to prevent deformation of the display unit by contacting with one surface of the display unit, the method comprising:

transforming, via a wireless power transmitting unit of the mobile terminal, power supplied from the battery into a magnetic field, and transmitting the magnetic field to at least one other terminal placed within a predetermined distance from the mobile terminal;

receiving, via a wireless power receiving unit of the mobile terminal, an external magnetic field and transforming the externally received magnetic field into the power;

cutting off, via a shielding member of the mobile terminal, a magnetic field, where the shielding member is positioned between the wireless power transmitting unit and the wireless power receiving unit; and controlling, via a controller of the mobile terminal, an amount of power supplied from the battery to the wireless power transmitting unit and charging the battery with the power transformed by the wireless power receiving unit, wherein the wireless power transmitting unit transforms the power supplied from the battery into the magnetic field by applying a current to a coil wire arranged within the reinforcement panel or contacts with one surface of the reinforcement panel.

7. The method of claim 6, wherein the reinforcement panel comprises a magnetic body.

8. The method of claim 7, wherein the magnetic body comprises a ferrite magnetic body.

9. The method of claim 6, further comprising:

receiving, via the wireless power receiving unit, the external magnetic field via a coil-shaped wire;

generating a current voltage and current induced into the coil-shape wire; and transforming the voltage and current into the power used to charge the battery.

10. The method of claim 9, further comprising:

transforming, via the wireless power transmitting unit, the power supplied from the charged battery into the magnetic field and transmitting the magnetic field to said at least one other terminal; and receiving, via the wireless power receiving unit, the external magnetic field from a charging pad in which the mobile terminal is placed above the charging pad, wherein said at least one other terminal is superimposed with the mobile terminal and the charging pad.

* * * * *